(12) United States Patent
Pakusch et al.

(10) Patent No.: US 6,444,729 B1
(45) Date of Patent: Sep. 3, 2002

(54) PROCESS FOR PREPARING PULVERULENT POLYMERS BY DRYING AQUEOUS POLYMER DISPERSIONS

(75) Inventors: Joachim Pakusch, Speyer; Maximilian Angel, Schifferstadt; Peter Claassen, Ludwigshafen; Andree Dragon, Speyer, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 15 days.

(21) Appl. No.: 09/609,973

(22) Filed: Jul. 6, 2000

Related U.S. Application Data

(62) Division of application No. 09/022,382, filed on Feb. 12, 1998, now Pat. No. 6,133,345.

(30) Foreign Application Priority Data

Feb. 26, 1997 (DE) .......................... 197 07 746

(51) Int. Cl.$^7$ .......................... C08L 33/14; C08K 3/00; C08K 3/13; C08K 3/30; C08K 3/34
(52) U.S. Cl. .......................... 524/5; 525/221; 525/223
(58) Field of Search ................ 525/221, 223; 524/5

(56) References Cited

U.S. PATENT DOCUMENTS

| | | |
|---|---|---|
| 3,883,489 A | 5/1975 | Matschke et al. |
| 4,049,744 A | 9/1977 | Masters |
| 4,069,275 A * | 1/1978 | Labana et al. .......... 525/223 |
| 4,816,558 A | 3/1989 | Rauch et al. |
| 4,847,309 A | 7/1989 | Klesse et al. |
| 5,225,478 A | 7/1993 | Beckerle et al. |
| 5,342,897 A | 8/1994 | Franzman et al. |
| 5,462,978 A | 10/1995 | Penzel et al. |
| 5,604,272 A | 2/1997 | Penzel et al. |

FOREIGN PATENT DOCUMENTS

| | | |
|---|---|---|
| DE | 24 45 813 | 4/1976 |
| EP | 0 078 449 | 5/1983 |
| EP | 0 262 326 | 4/1988 |
| EP | 0 407 889 | 1/1991 |
| WO | WO 96/03923 | 2/1996 |

OTHER PUBLICATIONS

Derwent Publications, JP 84–266251, Mar. 1, 1983.
Abstract, No. 46976 K/20, DE 3143–071, Oct. 30, 1981 (Corresponds to EP 0 078 449).
Abstract, No. 46975 K/20, DE3143–070, Oct. 30, 1981 (Corresponds to EP 078 449).
Abstract, Derwent Publications Ltd., No. 30272X/17, DT 2445–813, Sep. 25, 1974 (Corresponds to DE 24 45 813).

* cited by examiner

*Primary Examiner*—Peter A Szekely
(74) *Attorney, Agent, or Firm*—Oblon, Spivak, McClelland, Maier & Neustadt, P.C.

(57) ABSTRACT

The invention provides:
- for a process for preparing pulverulent polymers by drying aqueous polymer dispersions in the presence of copolymers based on ethylenically unsaturated $C_3$–$C_6$ carboxylic acids and their hydroxyalkyl esters as assistants;
- polymer powders obtainable by this process;
- aqueous polymer dispersions obtainable by free-radical aqueous emulsion polymerization of ethylenically unsaturated monomers in the presence of the novel copolymers, and the powders obtainable therefrom, and
- a polymeric binder as well as and mineral building materials which comprise the novel polymer powders.

8 Claims, No Drawings

PROCESS FOR PREPARING PULVERULENT POLYMERS BY DRYING AQUEOUS POLYMER DISPERSIONS

This application is a Divisional of U.S. Ser. No. 09/022,382, filed Feb. 12, 1998, now U.S. Pat. No. 6,133,345.

DESCRIPTION

The present invention relates to a process for preparing pulverulent polymers by drying aqueous polymer dispersions in the presence of copolymers or salts thereof which in copolymerized form comprise ethylenically unsaturated $C_3$–$C_6$ carboxylic acids (monomers A) and hydroxyalkyl esters of ethylenically unsaturated $C_3$–$C_6$ carboxylic acids (monomers B), with or without further monomers C, as drying assistants, especially in connection with the spray drying of aqueous polymer dispersions. In addition, the present invention relates to a process for preparing polymer powders which can be redispersed in an aqueous medium, and to the redispersible polymer powders and their use.

Aqueous polymer dispersions are used in a large number of fields, for example as binders, in particular for synthetic resin renders, highly pigmented interior paints, and coating compositions, and as adhesives or modifiers for mineral building materials. The term mineral building materials is used hereinbelow to denote building materials which essentially comprise a mineral binder, such as lime, gypsum and/or, in particular, cement, and additions such as sand or stones, and which are converted by stirring them up with water into their ready-to-use form (mineral building material preparation), which over time, in air or under water, solidifies to form a stonelike structure. Accordingly, aqueous polymer dispersions for modifying mineral building materials can be added only at the site of use. In contrast, polymer powders can be formulated together with the mineral binder, thus simplifying the preparation of the mineral building materials. Moreover, polymer powders have the advantage over dispersions that they do away with the need to transport the dispersion medium, mainly water, from the place of preparation to the site of use.

The water-redispersible polymer powders that are required for the abovementioned purposes are obtainable in principle by drying the corresponding aqueous polymer dispersions. Examples of such drying techniques are freeze drying and spray drying. In spray drying, which is found to be particularly judicious when preparing relatively large amounts of powder, the aqueous polymer dispersion is sprayed, and the water is removed, in a stream of hot air; the air used for drying, and the sprayed dispersion, are preferably passed in cocurrent through the dryer (see for example EP-A 262 326 or EP-A 407 889).

However, the resulting polymer powder has the disadvantage that its redispersibility in an aqueous medium is in general not entirely satisfactory, since the polymer particle diameter distribution which results from redispersion generally differs from that in the initial aqueous dispersion. The reason for this is that aqueous polymer dispersions, unlike polymer solutions, do not form thermodynamically stable systems. Instead, the system tends to reduce the polymer/dispersion medium interface by combining small primary particles to form larger, secondary particles (gel specks, coagulum). In the state of disperse distribution in the aqueous medium, this can be prevented even for a relatively long time by the addition of dispersants, such as emulsifiers and protective colloids. In the course of the drying of aqueous polymer dispersions, however, the action of the dispersants is in many cases inadequate, and irreversible formation of secondary particles takes place to a certain extent. In other words, the secondary particles are retained on redispersion and impair the performance characteristics of the aqueous polymer dispersions that are obtainable on redispersion.

To prevent or at least reduce the formation of secondary particles in the course of drying, it has long been known to employ drying assistants. These substances are referred to as spray assistants, since spray drying in particular promotes the formation of irreversibly agglomerated secondary particles. This effect is all the more pronounced the lower the glass transition temperature (and thus the softening point or minimum film-forming temperature) of the polymer particles, especially if it is below the drying temperature. At the same time, drying assistants generally reduce the formation of polymer coating which remains adhering to the dryer wall, and thereby bring about an increase in the powder yield.

Examples of customary drying assistants are condensates of formaldehyde with aromatic hydrocarbons containing sulfonate groups (see for example DE-A 24 45813, EP-A 784 449, EP-A 407 889). Such condensates, although effective spray assistants, nevertheless have the disadvantage that as a result of the action of oxygen they tend to undergo discoloration, especially in an alkaline medium, for example in alkaline mortar. EP-A 467 103 discloses spray assistants comprising fully or partly neutralized, water-soluble copolymers which in addition to hydrophobic monomers comprise from 50 to 80 mol % of carboxyl-containing monomers.

EP-A-629 650 describes the use of polymers obtainable by free-radical polymerization, in an aqueous medium, of monomer mixtures comprising from 15 to 80% by weight of a monomer of the formula

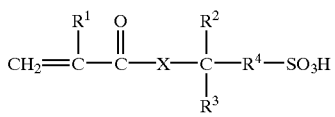

where $R^1$, $R^2$ and $R^3$ independently are H or $C_1$–$C_3$-alkyl, $R^4$ is $C_1$–$C_5$-alkylene and X is O or NH, and from 20 to 85% by weight of a free-radically copolymerizable monomer, as spray assistants in the spray drying of aqueous polymer dispersions.

JP-A 59-162161 describes water-soluble copolymers which comprise in copolymerized form from 10 to 90 mol %, based on the overall number of monomers, at least one hydroxyalkyl ester of an ethylenically unsaturated monocarboxylic acid and from 10 to 90 mol % of at least one ethylenically unsaturated mono- or dicarboxylic acid. The use of the copolymers as drying assistants is not proposed.

When using drying assistants a fundamental consideration is that they may influence the properties of the polymer powders and thus also the properties of preparations comprising such polymer powders. It is known, for example, that the water resistance of synthetic-resin renders based on polymer powders which are free from spray assistant is higher than that of synthetic-resin renders based on polymer powders which have been prepared using vinylpyrrolidone-vinyl acetate copolymers of EP-A 784 449 or polyvinyl alcohol of DE-A 221 4410 as drying assistants.

When using polymer powders dried with the aid of drying agents in mineral building materials it is often a disadvantage that the drying assistants retard the setting process (low flexural and compressive strength) and may cause a reduction in the ultimate hardness. Conversely, the duration of processability of polymer-modified mineral building material preparations which do not have the abovementioned disadvantages is often inadequate. Moreover, it is desirable to improve the adhesion of polymer-modified building material preparations on critical substrates, for example highly absorbent substrates or hydrophobic surfaces, for example rigid foams based on polyurethane or polystyrene, or plastics films.

It is an object of the present invention, therefore, to provide drying assistants for the drying of aqueous polymer dispersions which do not have the disadvantages of the prior art and which in particular do not retard the increase in hardness when used in mineral building materials. At the same time it is intended that they should improve the processing duration and the flowability of the mineral building material preparations. The polymer-modified mineral building materials should, moreover, possess high ultimate hardness and good adhesion to critical substrates.

We have found that this object is achieved, surprisingly, by the use of copolymers based on ethylenically unsaturated carboxylic acids having 3 to 6 C atoms and hydroxyalkyl esters of these carboxylic acids as drying assistants for aqueous polymer dispersions.

The present invention accordingly provides for the use of copolymers or salts thereof which comprise in copolymerized form, based in each case on the overall number of copolymerized monomers, from 20 to 95 mol % of at least one ethylenically unsaturated carboxylic acid having 3 to 6 C atoms (monomers A), from 5 to 80 mol % of at least one hydroxyalkyl ester of an ethylenically unsaturated carboxylic acid having 3 to 6 C atoms (monomers B), and up to 10 mol % of further monomers C, as assistants in the drying of aqueous polymer dispersions.

The present invention additionally provides a process for preparing pulverulent polymers in the presence of the novel drying assistants.

The present invention also provides the polymer powders prepared in the presence of the abovementioned drying assistants and for the use of these polymer powders as binders in paints, varnishes, adhesives, coating compositions and synthetic-resin renders and as modifiers in mineral building materials.

The ethylenically unsaturated carboxylic acids having 3 to 6 C atoms ($C_3$–$C_6$ carboxylic acids; monomers A) comprise acrylic, methacrylic, crotonic, isocrotonic, vinylacetic, 2-ethylacrylic and 2-propylacrylic acid. The hydroxyalkyl esters of these ethylenically unsaturated $C_3$–$C_6$ carboxylic acids (monomers B) are preferably those wherein the hydroxyalkyl has 2 to 10 carbons and is uninterrupted or interrupted by one or more nonadjacent oxygens, for example 2-hydroxyethyl, 2- or 3-hydroxypropyl, 2-, 3- or 4-hydroxybutyl, 5-hydroxy-3-oxapentyl, 6-hydroxy-4-oxahexyl, 8-hydroxy-3,6-dioxaoctyl, 11-hydroxy-3,6,9-trioxaundecyl and 14-hydroxy-3,6,9,12-tetraoxatetradecyl.

Preference is given to using copolymers which as monomers A comprise acrylic acid and/or methacrylic acid in copolymerized form. The preferred copolymers can to a minor extent comprise, in particular, up to 20 mol % of other $C_3$–$C_6$ carboxylic acids as well, in copolymerized form, based on the overall amount of monomer A. Particular preference is given to polymers in which the sole monomer A is acrylic acid. Suitable monomers B are preferably the hydroxyalkyl esters of acrylic acid and/or of methacrylic acid. Of these, particular preference is given to 2-hydroxyethyl acrylate, 2-hydroxyethyl methacrylate, 2-hydroxypropyl acrylate, 2-hydroxypropyl methacrylate, 1-hydroxypropyl 2-acrylate, 1-hydroxypropyl 2-methacrylate, and also industrial mixtures of 1- and 2-hydroxypropyl (meth)acrylate as obtained when acrylic or methacrylic acid is reacted with propylene oxide, to 3-hydroxypropyl acrylate and/or to 3-hydroxypropyl methacrylate. Some of the preferred monomers B, in particular not more than 20 mol % based on the overall amount of monomer B, can be replaced by other hydroxyalkyl esters. It is possible, furthermore, to use polymers comprising further monomers C in copolymerized form.

Monomers C comprise monoethylenically unsaturated monomers such as $C_2$–$C_6$ olefins, for example ethylene or propylene, vinylaromatic monomers, such as styrene, a-methylstyrene, o-chlorostyrene or vinyltoluenes, esters of vinyl alcohol and $C_1$–$C_{20}$ linear or branched aliphatic monocarboxylic acids, such as vinyl acetate, vinyl propionate, vinyl n-butyrate, vinyl laurate and vinyl stearate, esters of monoethylenically unsaturated $C_3$–$C_6$ carboxylic acids or $C_4$–$C_8$ dicarboxylic acids with $C_1$–$C_{12}$-alkanols, for example esters of acrylic, methacrylic, maleic and/or fumaric acid with methanol, ethanol, n-butanol, isobutanol, tert-butanol and 2-ethylhexanol, and also acrylonitrile and/or methacrylonitrile, and conjugated dienes, such as 1,3-butadiene or isoprene. Further suitable monomers C are the amides of ethylenically unsaturated $C_3$–$C_6$ carboxylic acids or $C_4$–$C_8$ dicarboxylic acids, such as acrylamide, methacrylamide, maleic acid monoamide, N-vinyllactams such as N-vinylpyrrolidone, and ethylenically unsaturated sulfonic acids and their salts, such as vinylsulfonic or 2-acrylamido-2-methylpropanesulfonic acid. Other monomers which can be used as monomers C are ethylenically unsaturated $C_4$–$C_8$ dicarboxylic acids, such as maleic, fumaric, itaconic or citric acid, their anhydrides, for example maleic anhydride, or their monoesters with $C_1$–$C_{12}$-alkanols, for example monomethyl maleate, mono-n-butyl maleate. The copolymers employed in accordance with the invention comprise as monomers C in particular the abovementioned sulfonic acids and/or their salts, especially their sodium salts, in copolymerized form.

In a preferred embodiment the copolymers contain from 30 to 70 mol %, in particular from 40.5 to 49.5 mol %, of monomers A, from 30 to 70 mol %, in particular from 50.5 to 59.5 mol %, of monomers B and up to 9 mol %, in particular up to 5 mol %, of monomers C in copolymerized form. Very particularly preferred monomer combinations are: acrylic acid and hydroxyethyl acrylate; acrylic acid and hydroxyethyl methacrylate; acrylic acid and hydroxypropyl acrylate; acrylic acid, hydroxyethyl methacrylate and 2-acrylamido-2-methylpropanesulfonic acid; and acrylic acid, hydroxypropyl acrylate and 2-acrylamido-2-methylpropanesulfonic acid.

The novel copolymers preferably have a number-average molecular weight $M_n$>5000, in particular $M_n$>8000, and, with very particular preference, $M_n$>10,000. $M_n$ is preferably <15,000. The weight-average molecular weight $M_w$ is preferably within the range from 20,000 to 70,000. Preference is given to copolymers whose polydispersibility U (=$M_w/M_n$) is in the range from 3 to 10 and, in particular, in the range from 3 to 5.

The basis of reference for the above data comprises the molecular weights of the Na salts of the copolymers as determined by gel permeation chromatography (GPC). GPC was carried out using four columns in series:
  1. Internal diameter: 7.8 mm, length: 30 cm, separation material: TosoHaas TSK PW-XL 5000,
  2. Internal diameter: 7.8 mm, length: 30 cm, separation material: Waters Ultrahydrogel 1000,
  3. Internal diameter: 7.8 mm, length: 30 cm, separation material: Waters Ultrahydrogel 500, 4. Internal diameter: 7.8 mm, length: 30 cm, separation material: Waters Ultrahydrogel 500.

The loaded material comprises 200 μl of a 0.1% strength by weight aqueous solution of the copolymer I neutralized with sodium hydroxide. The columns are at a controlled temperature of 35° C.

The eluent used is an aqueous 0.08 molar solution of a TRIS buffer (pH 7) to which 0.15 mol/l NaCl and 0.01 mol/l $NaN_3$ are added. The selected flow rate of the eluent is 0.5 ml/min. Before the sample is loaded it is filtered through a Sartorius Minisart RC 25 filter (pore size 0.20 μm). The detector used is an ERC 7510 differential refractometer from ERMA. Calibration is in accordance with R. Brüssau et al. in Tenside, Surf.Det. 28 (1991) 596–406. In this determination method, relative molecular weights <700 are not taken into account.

The preparation of the copolymers employed in accordance with the invention is known in principle and can be carried out in accordance with the customary processes for the preparation of water-soluble copolymers from water-soluble, ethylenically unsaturated monomers. It is advantageously effected by free-radical solution polymerization of the monomers A, B and, if used, C. It is preferably conducted in polar solvents, for example in $C_1$–$C_3$ alcohols such as methanol, ethanol, n- or isopropanol, water, or alcohol/water mixtures. Preference is given to water containing not more than 20% by volume of alcohol, and particular preference to water as the sole solvent.

The monomers A can be used in the form of the free acid or, preferably, in the form of its salts, for example its alkali metal, alkaline earth metal and/or ammonium salts. It is also possible to conduct the polymerization in the presence of a base, so that some or all of the monomers A are in neutralized form in the polymerization mixture. Particular preference is given to using monomers A in the form of an aqueous solution which has been neutralized with an alkali metal hydroxide or alkaline earth metal hydroxide, in particular with aqueous sodium or calcium hydroxide.

The novel copolymers are preferably prepared by a feed technique; in other words, the major portion of the monomers, in particular the entirety of the monomers, is fed continuously to the reaction mixture. With very particular preference the monomers A, B and C are metered in as an aqueous solution, in particular as a neutralized aqueous solution.

There are no restrictions on the initiators for the polymerization reaction. Suitable initiators preferably comprise organic and, in particular, inorganic peroxides, such as sodium peroxodisulfate. The amount of initiator is preferably in the range from 0.5 to 10% by weight and with particular preference from 2 to 8% by weight, based on the monomers to be polymerized. The initiator can be included in the initial charge to the polymerization vessel or can be added continuously at the rate at which it is consumed, preferably as an aqueous solution, to the polymerization mixture. With particular preference, some of the initiator is included in the initial charge and the remaining amount of initiator is metered in.

To establish the desired molecular weight of the copolymers, molecular weight regulators can be added in a known manner to the polymerization reaction. These are preferably compounds containing a thiol group and, insofar as the polymerization is conducted in water or an aqueous-alcoholic reaction medium, are preferably water-soluble compounds. Examples are ethyl thioglycolate, 2-ethylhexyl thioglycolate, cysteine, 2-mercaptoethanol, 3-mercaptopropanol, 3-mercaptoglycerol, mercaptoacetic acid, or 3-mercaptopropionic acid. The amount of regulator depends of course on the nature of the monomers and initiator. It can readily be determined by the skilled worker on the basis of simple experiments. It is preferred to use up to 1.0% by weight and, in particular, not more than 0.5% by weight of molecular weight regulator, based on the monomers A, B and C to be polymerized.

The polymerization temperature depends of course on the chosen initiator system and can be in the range from 30 to 100° C. and, in particular, from 40 to 90° C. In order to complete the conversion the polymerization reaction can be followed by a postpolymerization which is brought about by adding further initiator and/or raising the temperature. The actual period of polymerization (monomer feed) is in the range from 0.5 to 6 hours, preferably from 1 to 5 hours. The overall period of polymerization, including in particular the postpolymerization phase, is within the range from 1.5 to 10 hours, preferably from 2.5 to 8 hours.

The polymer dispersion that is to be dried can be a primary dispersion, i.e. a polymer dispersion that has been obtained directly by the method of free-radical aqueous emulsion polymerization. Alternatively, it can be a secondary dispersion, i.e. where a polymer obtained by solution polymerization is converted subsequently into an aqueous polymer dispersion.

The novel copolymers are particularly advantageous for drying dispersions of polymers whose glass transition temperature (DSC, midpoint temperature, ASTM D 3418-82) is $\leq 65°$ C., preferably $\leq 50°$ C., particularly preferably $\leq 30°$ C. and, with very particular preference, $\leq 20°$ C. The glass transition temperature of the polymers is generally $\geq -50°$ C., preferably $\geq -25°$ C. and, in particular, $\geq -5°$ C.

In this context it is often useful to estimate the glass transition temperature $T_g$ of the dispersed polymer. According to Fox (T. G. Fox, Bull. Am. Phys. Soc. (Ser. II) 1, 123 [1956] and Ullmanns Enzyklopädie der technischen Chemie, Weinheim (1980), pp. 17, 18), for the glass transition temperature of copolymers of high molar mass, it holds in good approximation that $$\frac{1}{T_g} = \frac{X^1}{T_g^1} + \frac{X^2}{T_g^2} + \dots \frac{X^n}{T_g^n}$$

where $X^1, X^2, \dots, X^n$ are the mass fractions $1, 2, \dots, n$ and $T_g^1, T_g^2, \dots, T_g^n$ are the glass transition temperatures, in kelvins, of homopolymers of each of the monomers $1, 2, \dots, n$. The individual $T_g^s$ are known, for example, from Ullmann's Encyclopedia of Industrial Chemistry, VCH, Weinheim, Vol. A 21 (1992) p. 169 or from J. Brandrup, E. H. Immergut, Polymer Handbook 3rd ed., J. Wiley, New York 1989.

Preferred polymers are those composed of:
from 80 to 100% by weight of at least one monomer a selected from $C_2$–$C_6$ olefins; vinylaromatic compounds; esters of ethylenically unsaturated $C_3$–$C_6$ carboxylic or $C_4$–$C_8$ dicarboxylic acids and $C_1$–$C_{12}$-alkanols, preferably $C_1$–$C_8$-alkanols, or $C_5$–$C_{10}$-cycloalkanols; vinyl, allyl or methallyl esters of aliphatic $C_1$–$C_{20}$ carboxylic acids and conjugated dienes, and from 0 to 20% by weight of at least one other monomer, b, which has at least one ethylenically unsaturated group.

In this case the expressions $C_n$–$C_m$ relate to that number of carbons, of a particular class of compounds, which is possible within the scope of the invention. Alkyls can be linear or branched. $C_n$–$C_m$-Alkylaryl is aryl which carries a $C_n$–$C_m$-alkyl.

Examples of $C_2$–$C_6$ olefins are, in particular, ethylene, propene and isobutene. Examples of vinylaromatic compounds are styrene, α-methylstyrene or vinyltoluenes, such as o-vinyltoluene.

The esters of ethylenically unsaturated $C_3$–$C_6$ monocarboxylic acids or $C_4$–$C_8$ dicarboxylic acids are, in particular, esters of acrylic, methacrylic, maleic, fumaric or itaconic acid. Specific examples of such esters are methyl (meth)acrylate, ethyl (meth)acrylate, n-butyl (meth)acrylate, isobutyl (meth)acrylate, t-butyl (meth)acrylate, 2-ethylhexyl (meth)acrylate, decyl (meth)acrylate, dodecyl (meth)acrylate or cyclohexyl (meth)acrylate, 4-tert-butylcyclohexyl (meth)acrylate or 3,3,5-trimethylcyclohexyl (meth)acrylate.

Vinyl, allyl and methallyl esters that can be used comprise vinyl acetate, vinyl propionate, vinyl n-butyrate, vinyl laurate and vinyl stearate, the corresponding allyl and methallyl esters, and the corresponding esters with α-branched $C_{10}$–$C_{12}$ carboxylic acids, which are available commercially, for example, under the designation Veova® from Shell. Conjugated dienes comprise, for example, butadiene, isoprene and chloroprene.

Particularly preferred monomers a are n-butyl acrylate, 2-ethylhexyl acrylate, methyl methacrylate, styrene and butadiene.

The monomers b are preferably the abovementioned ethylenically unsaturated $C_3$–$C_6$ carboxylic acids, their amides, which comprise both mono- and dialkylamides and mono- and dialkylaminoalkylamides and their quaternization products, the esters of ethylenically unsaturated carboxylic acids with amino alcohols and their quaternization products, N-methylolamides and hydroxy-$C_2$–$C_6$-alkyl esters of the abovementioned ethylenically unsaturated $C_3$–$C_6$ carboxylic acids. it is also possible to use ethylenically unsaturated $C_4$–$C_8$ dicarboxylic acids and their anhydrides, for example maleic acid, maleic anhydride, fumaric acid, itaconic acid, itaconic anhydride, the N-vinyl derivatives of cyclic lactams or of nitrogen heterocycles, for example vinylpyrrolidone, N-vinylimidazoles or their quaternizatiuon products, ethylenically unsaturated sulfonic acids, for example those indicated above, and also acrylonitrile and methacrylonitrile. Other suitable monomers b are those containing silane groups, such as vinyl- and allyl-trialkoxysilanes and/or (meth )acryloyloxypropyl-trialkoxysilanes.

Particularly preferred monomers b are acrylamide, methacrylamide, acrylic acid, methacrylic acid, acrylonitrile, methacrylonitrile, 2-acrylamido-2-methylpropanesulfonic acid, vinylpyrrolidone, hydroxyethyl acrylate, hydroxyethyl methacrylate, hydroxypropyl acrylate, hydroxypropyl methacrylate, quaternized vinylimidazole, N,N-dialkylaminoalkyl (meth) acrylates, N,N-dialkylaminoalkyl (meth) acrylamides, trialkylammoniumalkyl (meth)acrylates and trialkylammoniumalkyl (meth)acrylamides.

With particular preferance, the polymer dispersions which are to be dried are composed of:

| | |
|---|---|
| from 30 to 70% by weight | of at least one vinylaromatic compounds, especially styrene, |
| from 30 to 70% by weight | of at least one ester of an ethylenically unsaturated $C_3$–$C_6$ monocarboxylic acid with a $C_1$–$C_{12}$-alkanol, especially the $C_1$–$C_8$-alkyl acrylates and $C_1$–$C_8$-alkyl methacrylates, and |
| from 0 to 10% by weight | of at least one monomer selected from ethylenically unsaturated carboxylic acids having 3 to 6 C atoms and their amides. |

Further preferred polymer dispersions are composed of combinations of vinylaromatic monomers with conjugated dienes and with or without ethylenically unsaturated $C_3$–$C_6$ carboxylic acids and/or their amides, for example styrene, butadiene with up to 10% by weight of acrylic acid, methacrylic acid, acrylamide and/or methacrylamide; or of vinyl esters of aliphatic $C_1$–$C_{20}$ carboxylic acids with $C_1$–$C_8$-alkyl acrylates or methacrylates.

Other preferred polymer dispersions are those in which the weight-average diameter $d_w$ of the dispersed polymer particles is ≧100 nm and with particular preference is ≧300 nm. $d_w$ is usually ≦2000 nm. It is also favorable if the diameters of the dispersed polymer particles are distributed over a broad range.

The $d_w$ of the particle size is defined as usual as the weight average of the particle size, as determined using an analytical ultracentrifuge by the method of W. Scholtan and H. Lange, Kolloid-Z. and Z.-Polymere 250 (1972) 782–796. The ultracentrifuge measurement gives the integral mass distribution of the particle diameter of a sample. From this it is possible to derive what percentage by weight of the particles have a diameter equal to or below a certain size.

An appropriate measure for characterizing the breadth of the diameter distribution is the quotient $Q=(d_{90}-d_{10})/d_{50}$, where $d_m$ is the diameter not exceeded by m % by weight of the dispersed polymer particles. Q is preferably from 0.2 to 1.5. The preparation of polymer dispersions having such a breadth of particle distribution is known to the skilled worker, for example from DE-A-43 07 683.

The ratio of weight-average molecular weight $M_w$ to number-average molecular weight $M_n$ of the polymers can be from 1 to 30 or from 1 to 20 or from 1 to 8. The molecular weight can therefore be substantially uniform or distributed over a certain breadth.

The preparation of the polymer dispersions to be dried is known. In general it is carried out by free-radical polymerization, which is preferably conducted in polar solvents, especially in water. To establish the desired molecular weight it is possible to use molecular weight regulators. Suitable such regulators are, for example, compounds which have a thiol group (see above) and/or a silane group (for example mercaptopropyltri-methoxysilane), and also allyl alcohols or aldehydes, such as formaldehyde, acetaldehyde, etc.

Examples of suitable initiators are inorganic peroxides, such as sodium peroxodisulfate, azo compounds or redox initiators (in this regard see Römpp, Chemielexikon 5th ed., p. 3811). Depending on the monomer composition the polymerization can be carried out as a solution polymerization or, preferably, as a free-radical aqueous emulsion polymerization. Solution polymers, which are obtainable by polymerization in an organic solvent, are subsequently converted to the aqueous polymer dispersion (a so-called secondary dispersion), preferably by replacing the solvent with water.

If the polymer dispersion is prepared by emulsion polymerization, this takes place in a customary manner. In general use is made of a protective colloid, such as polyvinyl alcohol, polyvinylpyrrolidone or cellulose derivatives, or anionic and/or nonionic emulsifiers, such as ethoxylated mono-, di- or trialkylphenols, ethoxylated fatty alcohols, and alkali metal salts or ammonium salts of $C_8$–$C_{12}$-alkyl sulfates, sulfuric monoesters of ethoxylated $C_{12}$–$C_{18}$-alkanols, $C_{12}$–$C_{18}$-alkylsulfonic acids, $C_9$–$C_{18}$-alkylarylsulfonic acids and sulfonated alkyldiphenyl ethers. Polymerization is generally conducted at from 50 to 120° C., especially from 70 to 100° C.

When preparing the polymer dispersion that is to be dried it is normal to operate by a feed technique (see above). If the polymer dispersion to be dried is prepared by emulsion polymerization it may be advantageous to operate in the presence of a seed latex. Depending on the desired property this seed latex can be generated in situ or, as a separately produced latex, included in or metered into the polymerization mixture. For further details reference is made to DE-A 4213 967, DE-A 4213 968, EP-A 614 922, EP-A 567 811, EP-A 567 812 and EP-A 567 819, which are incorporated herein in their entirety by reference. In addition, it is often sensible to follow the actual polymerization reaction with a physical or chemical deodorization step. A physical step means, in particular, the azeotropic distillative removal of the unreacted monomers or the stripping of the dispersion with steam. Chemical deodorization refers to postpolymerization by the addition of further initiator after the end of the addition of monomer and/or increasing the reaction temperature.

As already stated above, the present invention additionally provides a process for preparing water-redispersible polymer powders by drying aqueous polymer dispersions in the presence of the above-described copolymers.

Drying can be carried out in a customary manner, for example by freeze drying or, preferably, by spray drying. In the case of spray drying, the polymer dispersion that is to be dried, and the drying assistant, are dried by spraying in a stream of hot air. This stream of hot air enters the drying tower at from 100 to 200° C., preferably from 120 to 160° C., and exits at from 30 to 90° C., preferably from 60 to 80° C. The components to be dried are introduced preferably in parallel into the stream of hot air. Spraying can be done by way of single-substance or multisubstance nozzles or using a rotating disk. The polymer powders are normally separated off using cyclones or filter separators.

In one embodiment of the present invention the polymer dispersion to be dried and the copolymer are prepared separately and then dried. In this case the aqueous polymer dispersion and the copolymer, preferably as an aqueous solution, can be mixed beforehand or metered separately to the drying apparatus.

In the latter case the drying assistant is preferably supplied as a solution, in particular an aqueous solution. In a preferred variant of this embodiment the drying agent is added before drying to the polymer dispersion that is to be dried, preferably in the form of an aqueous-alcoholic solution and, in particular, of an aqueous solution. In this case the copolymer can be added in the acid form or, preferably, in neutralized (salt) form. The copolymers are preferably used in the form of an aqueous solution of their alkali metal, alkaline earth metal and/or ammonium salts, especially in the form of their sodium or calcium salts, as are obtained by neutralizing the copolymer solution with a suitable base or, in the case of the use of monomers A in salt form, in the course of the preparation of the copolymers.

The amount of drying assistants employed is preferably from 1 to 40% by weight, based on the solids content of the dispersion, preferably from 2 to 30% by weight and, in particular, from 10 to 30% by weight. Thus, the polymer powder obtainable by this process comprises the copolymer used as drying assistant which contains the monomers A, B, and, if used, C, in polymerized form, as well as the polymer of the polymer dispersion being dried by the process of the invention, preferably containing monomers a, and, if used, b, in polymerized form.

In addition to the novel drying assistants it is also possible in addition to use known drying assistants such as polyvinyl alcohol, polyvinylpyrrolidone, phenolsulfonic acid-formaldehyde condensates, naphthalenesulfonic acid-formaldehyde condensates, homopolymers of 2-acrylamido-2-methylpropanesulfonic acid, etc. Anticaking agents, such as highly disperse silicic acid, which are usually used for the drying of aqueous polymer dispersions, can also be employed, so as to prevent caking of the polymer powder in the course of storage. In the case of spray drying, the anticaking agents are generally fed in separately through a nozzle. Alternatively, they can be incorporated subsequently into the polymer powder in a manner known per se.

Another embodiment of the present invention relates to a drying process in which the drying agent, in other words one of the above-described copolymers, is present even during the preparation of the polymer dispersion that is to be dried. What this means is that the polymer dispersion to be dried is obtainable by free-radical aqueous emulsion polymerization of the monomers a and, if used, b in the presence of one of the above-described copolymers. Polymer dispersions of this kind can be dried in the manner described above without the addition of further drying assistants. However, it is also possible when drying such polymer dispersions to add further drying assistants, for example those of the present invention or those of the prior art, and also anticaking agents (see above).

In this embodiment the novel copolymers can be prepared in a first, separate polymerization reaction. The copolymers obtainable in this case are then used in the form of a solid or, preferably, in the form of a solution thereof, especially a solution of their salts, in the course of the free-radical aqueous emulsion polymerization of the monomers a and b. In this case some or, preferably, all of the novel copolymer is included in the initial charge.

For reasons not least of economics and process engineering it is often advantageous to prepare the copolymer and the polymer dispersion that is to be dried in a staged polymerization. This means that in a first stage a novel copolymer is prepared by free-radical polymerization of the monomers A, B and, if used, C and then a free-radical aqueous emulsion polymerization of the monomers a and b is conducted in the reaction mixture obtainable in the first stage. The monomers A, B, C, a and b are subject to the comments made above. In general, the molar ratios of the monomers A, B and, if used, C that are employed are comparable with those in the case of the separate preparation of the copolymers. The preferred weight ratio of the monomers of the first stage (A, B and C) and the monomers of the second stage (a and b) is in the range from 5:95 to 50:50, in particular from 10:90 to 40:60, particularly preferably from 15:85 to 30:70 and, with very particular preference, from 20:80 to 25:75.

In the preparation of the first stage the monomers A can be used either in the acid form or in their salt form (see above). The first stage is conducted in the manner described above. It can be followed, especially if the monomers A are employed in their acid form, by neutralization with a base, for example an alkali metal hydroxide or alkaline earth metal hydroxide.

As already mentioned above the second stage is conducted as a free-radical aqueous emulsion polymerization.

The second-stage polymerization is preferably carried out by a feed technique (see above). In this case the monomers a and b can be metered separately or together into the polymerization mixture. In one embodiment of the present invention the monomers a and b are metered as an aqueous emulsion into the polymerization mixture. In another embodiment, the monomers a are metered in in liquid form and the monomers b separately, as an aqueous solution. The rate of addition of the monomers a and b is generally constant but may also be subjected to continuous or stepwise increase.

As far as the initiators and regulators are concerned, the comments to be made for the second stage are essentially the same as what was said above for the preparation of the polymer dispersions that are to be dried. In the second stage it is preferred to use no regulators. Preferred initiators of the second stage are water-soluble peroxides, such as sodium peroxodisulfate or hydrogen peroxide, the latter preferably together with a reducing agent such as ascorbic acid, acetone bisulfite or sodium hydroxymethanesulfinate (redox initiator system). The initiator is preferably metered in to the polymerization mixture at the rate at which it is consumed. The amount of initiator is generally from 0.1 to 2% by weight, based on the monomers of the second stage.

The second stage can be carried out either with or without a customary dispersant.

Examples of suitable such dispersants are the conventional surfactants. Examples that may be mentioned include Dowfax® 2A1 from Dow Chemical Company, ethoxylated mono-, di- and trialkylphenols (degree of ethoxylation (EO): 3 to 50, alkyl: $C_4$ to $C_9$), ethoxylated fatty alcohols (EO: 3 to 50, alkyl: $C_8$ to $C_{36}$), and also alkali metal salts and ammonium salts of alkyl sulfates (alkyl: $C_8$ to $C_{12}$), of sulfuric monoesters of ethoxylated alcohols (EO: 4 to 30, alkyl: $C_{12}$ to $C_{18}$) and of ethoxylated alkylphenols (EO: 3 to 50, alkyl: $C_4$ to $C_9$), of alkylsulfonic acids (alkyl: $C_{12}$ to $C_{18}$) and of alkylarylsulfonic acids (alkyl: $C_9$ to $C_{18}$). Other suitable surfactants are given in Houben-weyl, Methoden der organischen Chemie, Volume XIV/1, Makromolekulare Stoffe, Georg-Thieme Verlag, Stuttgart, 1961, pages 192 to 208. Instead of or as a mixture with conventional surfactants, however, it is also possible to employ conventional protective colloids, such as polyvinyl alcohol, polyvinylpyrrolidone or amphiphilic block polymers with short hydrophobic blocks, for the purpose of costabilization. In general the amount of conventional dispersants used, based on the monomers that are to be polymerized, will not exceed 3% by weight, preferably 2% by weight.

Depending on the nature of the dispersion medium and of the initiator system used, the second stage is normally conducted at from 20 to 100° C., often from 50 to 95° C. and, in many cases, from 70 to 90° C. The staged preparation of the polymers is normally of course carried out under inert gas and with stirring.

The second-stage polymerization is normally conducted at atmospheric pressure (1 atm). However, especially when using monomers which are gaseous under atmospheric pressure, it can also be carried out under superatmospheric pressure. Similarly, polymerization temperatures above 100° C. are also possible (for example up to 130° C.). The duration of polymerization in the second stage is from about 0.5 to 7 hours, preferably from 1 to 5 hours.

As already mentioned above the polymerization reaction can be followed by a customary deodorization process. In a preferred embodiment of the present invention the dispersion of the polymer produced in stages is finally neutralized using a base, preferably an alkali metal hydroxide or alkaline earth metal hydroxide, for example aqueous sodium hydroxide solution or an aqueous suspension of $Ca(OH)_2$.

It has now surprisingly been found that in the free-radical aqueous emulsion polymerization of the monomers a and b it is possible to avoid the use of the customary protective colloids and/or emulsifiers if the polymerization reaction is conducted in the presence of the novel copolymers of the monomers A, B and, if used, C. In this case it is immaterial whether the novel copolymers have been prepared in a separate reaction or as the first stage in a staged polymerization. Accordingly, the novel copolymers have an action comparable with that of the customary protective colloids.

The polymers in the thus obtained polymer dispersions are called "stage polymers" regardless whether the copolymer was prepared in a separate polymerization reaction or in the first stage of a two stage process as mentioned above.

It is notable that emulsifier-free aqueous polymer dispersions are obtainable by this route. The polymeric particles in the thus obtained dispersion contain at least one copolymer, containing monomers A, B, and, if used, C in polymerized form, and the emulsion polymer of the monomers a, and if used, b.

Polymer dispersions of this kind often have performance advantages, since the emulsifier may impact disruptively on the utility. The use of the novel copolymers as protective colloids is new and is thus likewise provided for by the present invention.

The polymer dispersions prepared in the presence of the novel copolymers are likewise novel and provided by the present invention. Their solids content is in general in the range from 10 to 75% by weight, preferably from 20 to 65% by weight and usually from 30 to 50% by weight, based on the weight of the polymer dispersion. Polymer dispersions of this kind can be converted in the manner described above, without further drying assistants, to polymer powders. However, other drying assistants can be used. In this context it is immaterial whether the copolymer has been prepared by a separate polymerization reaction or in the first stage of a staged polymerization reaction (see above).

The thus obtained polymer powder comprises the stage polymer as described above and optionally further drying assistants.

The polymer powders obtainable when the copolymers are used in accordance with the invention are suitable as binders in paints, varnishes, adhesives, coating compositions (especially for paper) and synthetic resin renders, as are described in EP-A 629 650. This also applies of course to aqueous polymer dispersions which comprise the novel copolymers, especially to those aqueous polymer dispersions which are obtainable by free-radical aqueous emulsion polymerization in the presence of the novel copolymers.

A particular focus of the present invention is the use of the polymer powders, prepared in accordance with the invention, as modifiers in mineral building materials. The mineral building materials modified with the polymer powders prepared in accordance with the invention, relative to mineral building materials modified with conventional polymer powders, feature higher flexural and compressive strength during the setting process and a higher ultimate hardness. Furthermore, the flowability of the ready-to-use mineral building material preparations is improved and their processability is prolonged. Adhesion to a wide variety of substrates, for example to absorbent substrates such as concrete or marble, to metals, and especially to apolar substrates, such as rigid foams based on polystyrene or polyurethane, or substrates treated with hydrophobic coatings, is likewise improved relative to that of mineral building materials modified with conventional polymer powders.

The advantageous effect of the polymer powders prepared in accordance with the invention is especially manifest in the modification of mineral building materials whose mineral binder consists of from 70 to 100% by weight of cement and from 0 to 30% by weight of gypsum. The action in mineral building materials in which cement is the sole mineral binder is particularly advantageous. In this context, the novel action is essentially independent of the type of cement. Depending on the project at hand, therefore, it is possible to use blast furnace slag cement, oil shale cement, Portland cement, hydrophobicized Portland cement, quick-setting cement, high-expansion cement or high-alumina cement.

The dry composition of the mineral building materials preferably comprises: from 20 to 60% by weight, preferably from 20 to 50% by weight, of mineral binder; from 0.1 to 20% by weight, preferably from 0.1 to 10% by weight and, in particular, from 0.1 to 5% by weight, of modifying polymer powder, with or without up to 25% by weight of customary auxiliaries such as antifoams or thickeners; and, as the remainder, aggregates such as sand, gravel, fillers (for example calcium carbonate), pigments (for example $TiO_2$), natural or synthetic fibers, etc. Dry compositions of this type are likewise provided by the present invention.

The novel polymer powders can be incorporated into the mineral building materials by, for example, adding the polymer powder to the mineral building material preparation which has been made up with water, in other words to a preparation which already contains the mineral binder and the aggregates as well as any assistants. Alternatively, the polymer powders can be added in accordance with customary dry-mix techniques to a dry preparation of mineral building material that has not yet been made up with water, in other words to a preparation comprising mineral binder and aggregates. A further possibility is to preformulate the modifying polymer powder with the mineral binder constituent and then to add assistants, water and aggregates only when this formulation is actually used.

It is of course also possible to use the aqueous polymer dispersions and the novel copolymers without drying beforehand. This is the case in particular for aqueous polymer dispersions that have been prepared in the presence of the novel copolymers.

The Examples given below are intended to illustrate the present invention but without limiting it.

EXAMPLES

I. Analysis a) Molecular Weight

The novel copolymers were characterized in terms of their molecular weight in the manner described above by means of gel permeation chromatography.

b) Light Transmittance (LT)

The light transmittance stated is that of a 0.01% strength by weight aqueous dispersion at 20° C. with a path length of 2.5 cm, as determined by means of a customary photometer under white light.

II. Preparing the Novel Copolymers C1 to C7 and a Prior Art Copolymer CV1 (Examples 1 to 7, Comparison Example 1)

Example 1

Copolymer C1

1.6 kg of sodium peroxodisulfate in 39.3 kg of water were charged to a reactor and heated to 80° C. Then, still at 80° C., feed stream 1 was added continuously over the course of 2 hours and the mixture was allowed to react at 80° C. for 1.5 hours. Then, still at 80° C., feed stream 2 was added continuously over the course of 1 hour. After a further 60 minutes at 80° C. the mixture was cooled to room temperature and filtered through a 200 μm sieve, to give a clear aqueous copolymer solution having a solids content of 38.8% by weight and a pH of 4.5.

| Feed stream 1: | 15.1 kg | of deionized water |
|---|---|---|
| | 9.1 kg | of 25% strength by weight aqueous sodium hydroxide solution |
| | 11.2 kg | of acrylic acid (AA) |
| | 0.1 kg | of ethylhexyl thioglycolate |
| | 28.8 kg | of hydroxyethyl methacrylate (HEMA) |
| Feed stream 2: | 0.4 kg | of sodium peroxodisulfate |
| | 5.3 kg | of deionized water |

Example 2

Copolymer C2

0.6 kg of sodium peroxodisulfate in 26 kg of water were charged to a reactor and heated to 80° C. Beginning at the same time, feed stream 1 was added over the course of 2 hours and feed stream 2 over the course of 2.5 hours, at 80° C. After the end of feed stream 2, the reaction was allowed to continue at 80° C. for 60 minutes and then the mixture was filtered through a 200 μm sieve, to give a clear, aqueous polymer solution having a solids content of 38.8% by weight and a pH of 4.4.

| Feed stream 1: | as Example 1 | |
|---|---|---|
| Feed stream 2: | 1.4 kg | of sodium peroxodisulfate |
| | 18.6 kg | of deionized water |

Example 3

Copolymer C3

The polymerization was conducted similarly to Example 1.

| Initial charge: | 1.6 kg | of sodium peroxodisulfate |
|---|---|---|
| | 30.0 kg | of deionized water |
| Feed stream 1: | 15.0 kg | of deionized water |
| | 10.1 kg | of 25% strength by weight aqueous sodium hydroxide solution |
| | 12.7 kg | of acrylic acid (AA) |
| | 4.2 kg | of a 50% strength by weight solution of 2-acrylamido-2-methylpropane-sulfonic acid as sodium salt in water (AMPS) |
| | 25.2 kg | of hydroxypropyl acrylate (HPA) |
| Feed stream 2: | 0.4 kg | of sodium peroxodisulfate |
| | 11.7 kg | of deionized water |

The resulting clear, aqueous solution of the copolymer had a solids content of 37.9% by weight and a pH of 4.6.

Example 4
Copolymer C4

The polymerization was conducted similarly to Example 1.

| Initial charge: | as Example 1 | |
|---|---|---|
| Feed stream 1: | 14.4 kg | of deionized water |
| | 10.9 kg | of 25% strength by weight aqueous sodium hydroxide solution |
| | 13.9 kg | of acrylic acid (AA) |
| | 0.1 kg | of 2-ethylhexyl thioglycolate |
| | 26.1 kg | of 2-hydroxyethyl methacrylate (HEMA) |
| Feed stream 2: | as Example 1 | |

The resulting clear, aqueous copolymer solution had a solids content of 38.6% by weight and a pH of 4.5.

Example 5
Copolymer C5

The polymerization was conducted similarly to Example 1.

| Initial charge: | 0.5 kg | of sodium peroxodisulfate |
|---|---|---|
| | 11.8 kg | of deionized water |
| Feed stream 1: | 6.6 kg | of deionized water |
| | 0.8 kg | of calcium hydroxide |
| | 4.2 kg | of acrylic acid (AA) |
| | 7.8 kg | of hydroxyethyl methacrylate (HEMA) |
| Feed stream 2: | 0.1 kg | of sodium peroxodisulfate |
| | 1.6 kg | of deionized water |

The resulting clear, aqueous solution of the copolymer had a solids content of 39.4% by weight and a pH of 4.5.

Example 6
Copolymer C6

The polymerization was conducted similarly to Example 1.

| Initial charge: | 1.2 kg | of sodium peroxodisulfate |
|---|---|---|
| | 45.0 kg | of deionized water |
| Feed stream 1: | 15.1 kg | of deionized water |
| | 10.7 kg | of 25% strength aqueous sodium hydroxide solution |
| | 3.2 kg | of acrylic acid (AA) |
| | 14.2 kg | of methacrylic acid (MAA) |
| | 0.1 kg | of 2-ethylhexyl thioglycolate |
| | 12.6 kg | of hydroxypropyl acrylate (HPA) |
| Feed stream 2: | 0.3 kg | of sodium peroxodisulfate |
| | 11.7 kg | of deionized water |

The resulting clear, aqueous solution of the copolymer had a solids content of 29.1% by weight and a pH of 5.0.

Example 7
Copolymer C7

The polymerization was conducted as in Example 2.

| Initial charge: | 0.6 kg | of sodium peroxodisulfate |
|---|---|---|
| | 26.0 kg | of deionized water |
| Feed stream 1: | 14.4 kg | of deionized water |
| | 10.9 kg | of 25% strength by weight sodium hydroxide solution |
| | 13.9 kg | of acrylic acid (AA) |
| | 0.1 kg | of ethylhexyl thioglycolate |
| | 26.1 kg | of hydroxyethyl methacrylate (HEMA) |
| Feed stream 2: | as Example 2 | |

The resultant clear, aqueous solution of the copolymer had a solids content of 39.1% by weight and a pH of 4.4.

Comparison Example 1

Copolymer CV1

700 g of isopropanol were charged under inert gas to a pressure reactor and heated to 135° C. During this time and subsequently, the internal pressure varied within a range from 2.2 to 4.8 bar. Then, beginning at the same time, the monomer mixture was added continuously over the course of 210 minutes and the initiator feed stream continuously over the course of 240 minutes, while maintaining the temperature. After a further 90 minutes at the same temperature, the mixture was cooled to room temperature and diluted with 472 ml of isopropanol. The clear colorless polymer solution obtained had a solids content of 52.4% by weight.

Monomer mixture:

560.0 g of acrylic acid (AA)

840.0 g of styrene (S)

Initiator feed stream:

14.0 g of tert-butyl peroctoate 2.8 g of di-tert-butyl peroxide 245.0 g of isopropanol

TABLE 1

Monomer composition, molecular weights and glass transition temperatures of copolymers C1–C7 and CV1

| | Monomer A mol % | Monomer B mol % | Monomer C mol % | $M_n$ g/mol | $M_w$ g/mol | U | $T_G$[1] ° C. |
|---|---|---|---|---|---|---|---|
| C1 | AA 41.3 | HEMA 58.7 | — | 11,200 | 51,200 | 4.6 | 97 |
| C2 | AA 41.3 | HEMA 58.7 | — | 13,500 | 65,000 | 4.8 | 97 |
| C3 | AA 46.5 | HPA 51.1 | AMPS 2.4 | 8,200 | 26,800 | 3.3 | 15 |

TABLE 1-continued

Monomer composition, molecular weights and glass transition temperatures of copolymers C1–C7 and CV1

|     | Monomer A mol % | Monomer B mol % | Monomer C mol % | $M_n$ g/mol | $M_w$ g/mol | U | $T_G$[1] °C. |
|-----|-----------------|-----------------|-----------------|-------------|-------------|-----|--------------|
| C4  | AA 49.0         | HEMA 51.0       | —               | 12,300      | 57,900      | 4.7 | 100          |
| C5  | AA 49.0         | HEMA 51.0       | —               | 12,800      | 63,200      | 4.9 | 100          |
| C6  | AA 14.3 MAA 54.0 | HPA 31.7       | —               | 10,500      | 47,400      | 4.1 | 58           |
| C7  | AA 49.0         | HEMA 51.0       | —               | 16,000      | 91,000      | 5.7 | 100          |
| CV1 | AA 49.0         |                 | S 51.0          | 13,100      | 34,600      | 2.6 | 116          |

[1] glass transition temperature calculated by the method of Fox ($T_G^{Fox}$)
AA = acrylic acid; MAA = methacrylic acid; HEMA = hydroxyethyl methacrylate; HPA = hydroxypropyl acrylate (technical-grade mixture of 2-hydroxypropyl 1-acrylate and 1-hydroxypropyl 2-acrylate); AMPS = 2-acrylamido-2-methylpropanesulfonic acid; S = styrene

III. Preparing the Dispersions D1 to D4 that are to be Dried

Dispersion D1

A reactor was charged with a mixture of 14.0 kg of water, 0.9 kg of a 20% strength by weight solution of an ethoxylated tallow fatty alcohol (degree of ethoxylation 18), 0.42 kg of a 10% strength by weight aqueous formic acid solution, 0.18 kg of sodium hydrogen carbonate and 7.6 kg of feed stream 1. This mixture was heated to 90° C. and then, still at 90° C., 0.5 kg of feed stream 2 was added all at once. Then the remainder of feed stream 1 was added over the course of 2 hours and the remainder of feed stream 2 over the course of 2.5 hours, and after the end of feed stream 2, the reaction was allowed to continue for 2 hours more. The reaction mixture was cooled to 60° C., a solution of 0.1 kg of tert-butyl hydroperoxide in 2.3 kg of water was added, and then a solution of 0.2 kg of ascorbic acid in 4.0 kg of water was added over the course of 1 hour at 60° C. The temperature was maintained for 0.5 hour more, then reduced to room temperature, a suspension of 0.2 kg of Ca(OH)$_2$ in 0.7 kg of water was added, and the mixture was filtered through a 200 μm sieve. The glass transition temperature as calculated by the method of Fox ($T_G^{Fox}$) was −6° C.

The solids content of the resulting polymer dispersion was 59.9% by weight, the LT was 16% and the pH was 7.

| Feed stream 1: Monomer emulsion comprising | |
|---|---|
| 7.5 kg | of deionized water |
| 2.4 kg | of a 20% strength by weight solution of an ethoxylated tallow fatty alcohol (degree of ethoxylation 18); (emulsifier I) |
| 1.4 kg | of a 30% strength by weight solution of the sodium salt of the sulfuric monoester of an ethoxylated tallow fatty alcohol (degree of ethoxylation 30); (emulsifier II) |
| 4.0 kg | of 15% strength by weight aqueous methacrylamide solution |
| 2.4 kg | of 50% strength by weight aqueous acrylamide solution |
| 21.0 kg | of styrene |
| 37.2 kg | of n-butyl acrylate |
| Feed stream 2: 4.6 kg | of deionized water |
| 0.35 kg | of sodium peroxodisulfate |

Dispersion D2

Emulsion polymerization was conducted as described for D1.

| Feed stream 1: | 7.3 kg | of deionized water |
|---|---|---|
| | 2.4 kg | of emulsifier I |

| Feed stream 1: Monomer emulsion comprising | |
|---|---|
| 1.4 kg | of emulsifier II |
| 4.0 kg | of 15% strength by weight aqueous methacrylamide solution |
| 2.4 kg | of 50% strength by weight aqueous acrylamide solution |
| 27.0 kg | of styrene |
| 31.2 kg | n-butyl acrylate |

The solids content of the resulting polymer dispersion was 58.7% by weight, the LT 17%, the. $T_G^{Fox}$ 7° C. and the pH 7.2.

Dispersion D3

In a polymerization vessel, a mixture of 500 g of water, 2.5 g of sodium acetate, 2.5 g of butenol and 10 g of an ethoxylated cellulose (Natrosol® 250 GR) was heated to 80° C. Then first 150 g of feedstream 1 followed by 10 g of feed stream 2 were introduced all at once into the polymerization vessel, and polymerization was conducted at 80° C. for 20 minutes. Then, beginning simultaneously, the remainder of feed stream 1 (over the course of 3 hours) and the remainder of feed stream 2 (over the course of 3.5 hours) were metered in continuously, still at 80° C. The mixture was then stirred at 80° C. for 1 hour before, finally, being cooled to room temperature.

The solids content of the resulting aqueous polymer dispersion was 50.2% by weight. Its pH was 4 and the LT was 20%. The dispersed polymer had a glass transition temperature of −2° C. (DSC midpoint); the $T_G^{Fox}$ was 4° C.

| Monomer emulsion comprising | | |
|---|---|---|
| Feed stream 1: | 600 g | of vinyl propionate |
| | 200 g | of tert-butyl acrylate |
| | 150 g | of a 20% strength by weight aqueous solution of ethoxylated p-isooctylphenol (degree of ethoxylation 25), mixed with |
| | 10 g | of a block copolymer of ethylene oxide and propylene oxide (molar ratio EO:PO = 0.7, relative number-average molecular weight = 3200) and |
| | 343 g | of water |

| Monomer emulsion comprising | | |
|---|---|---|
| Feed stream 2: | 5 g | of sodium peroxodisulfate in 100 g of water. |

Dispersion D4

In a polymerization vessel, a solution of 6000 g of water and 17 g of a 45% strength by weight aqueous solution of the surface-active substance corresponding to Dowfax 2A1 (emulsifier III) was heated to the polymerization temperature of 80° C. Then, in succession in single portions, 1087 g of feed stream 1 and 108 g of feed stream 2 were added to the polymerization vessel and polymerization was conducted at 80° C. for 30 minutes. Then, still at 80° C., the remainder of feed streams 1 and 2 were supplied continuously over the course of 3.5 hours beginning at the same time. The reaction mixture was subsequently left to itself at 80° C. for 4 hours. Finally, it was cooled to room temperature and neutralized with 420 g of 25% strength by weight aqueous sodium hydroxide solution.

The solids content of the resulting aqueous polymer dispersion was 50.9%. Its pH was 8 and the LT was 46%. The dispersed polymer had a glass transition temperature of 60° C.; the $T_G^{Fox}$ was 49° C.

| Feed stream 1: | 12,150 g | of styrene |
|---|---|---|
| | 2,250 g | of butadiene |
| | 450 g | of a 50% strength aqueous solution of acrylamide |
| | 375 g | of acrylic acid |
| | 120 g | of tert-dodecyl mercaptan |
| | 117 g | of emulsifier III |
| | 250 g | of a 15% strength by weight aqueous solution of the sodium salt of the sulfuric monoester of lauryl alcohol, and |
| | 6033 g | of water |
| Feed stream 2: | 150 g | of sodium peroxodisulfate and |
| | 200 g | of water |

IV. Preparing the Novel Stage Polymers SD1 to SD7 (Example 8 to Example 14)

Example 8

Stage Polymer SD1

First of all an aqueous monomer solution (feed stream 1) was prepared from:

| 387.0 g | of deionized water |
|---|---|
| 151.2 g | of 2-hydroxyethyl methacrylate, |
| 58.8 g | of acrylic acid, and |
| 0.4 g | of ethylhexyl thioglycolate. |

A reaction vessel was charged with 8.4 g of sodium peroxodisulfate and 600 g of water, which were then heated to 80° C. Still at 80° C., feed stream 1 was added continuously over the course of 1 hour. 45 minutes after beginning the addition of feed stream 1, feed stream 2 was added over the course of a further 45 minutes. After the end of feed stream 1 the temperature was maintained for one hour and then, at 80° C., feed stream 3 was added over the course of 1.5 hours and feed stream 4 over the course of 2 hours. After the end of feed stream 4, the mixture was left to react at 80° C. for 1 hour. It was then cooled to room temperature, 134.4 g of 25% strength by weight aqueous sodium hydroxide solution were added, and the mixture was filtered through a 200 μm sieve.

The solids content of the resulting dispersion was 34.4%, the LT 10% and the pH 7.1. The $T_G^{Fox}$ for the first stage was 97° C. and for the second stage 12° C.

| Feed stream 2: | Solution of | |
|---|---|---|
| | 81.0 g | of deionized water |
| | 2.1 g | of sodium peroxodisulfate |
| Feed stream 3: | aqueous monomer emulsion comprising | |
| | 410.0 g | of deionized water |
| | 4.7 g | of emulsifier III |
| | 56.0 g | of 15% strength by weight aqueous methacrylamide solution |
| | 33.6 g | of 50% strength by weight aqueous acrylamide solution |
| | 378.0 g | of styrene |
| | 436.8 g | n-butyl acrylate |
| Feed stream 4: | Solution of | |
| | 410.0 g | of deionized water |
| | 10.5 g | of sodium peroxodisulfate |

Example 9

Stage Polymer SD2

First of all a monomer solution (feed stream 1) was prepared from

| 93.0 g | of deionized water |
|---|---|
| 23.4 g | of 25% strength by weight aqueous sodium hydroxide solution |
| 56.7 g | of hydroxyethyl methacrylate |
| 28.8 g | of acrylic acid |
| 9.0 g | of 50% strength by weight aqueous solution of the sodium salt of 2-acryl-amido-2-methylpropane-sulfonic acid |
| 0.2 g | of ethylhexyl thioglycolate |

3.6 g of sodium peroxodisulfate and 120 g of deionized water were heated to 80° C. in a reaction vessel, and, still at 80° C., feed stream 1 was added over the course of 1 hour. 45 minutes after beginning the addition of feed stream 1, feed stream 2 was added continuously over the course of 45 minutes. After the end of feed stream 2 the mixture was allowed to react at 80° C. for 50 minutes more.

Subsequently, still at 80° C., feed streams 3 and 4 were added over the course of 1.5 hours and feed stream 5 over the course of 2 hours. Then the mixture was allowed to react at 80° C. for a further 60 minutes, before 45 g of a 20% strength by weight suspension of calcium hydroxide in water were added and the mixture was filtered through a 200 μm sieve.

The resulting aqueous polymer dispersion had a solids content of 43.9% by weight, a light transmittance of 43% and a pH of 6.4. The $T_G^{Fox}$ of the first stage was 119° C. and that of the second stage was 12° C.

| Feed stream 2: | Solution of | |
| --- | --- | --- |
| | 0.9 g | of sodium peroxodisulfate |
| | 35.0 g | of deionized water |
| Feed stream 3: | 162.0 g | of styrene |
| | 187.2 g | of n-butyl acrylate |
| Feed stream 4: | Solution of | |
| | 70.0 g | of deionized water |
| | 24.0 g | of 15% strength by weight aqueous methacrylamide solution |
| | 14.4 g | of 50% strength by weight aqueous acrylamide solution |
| Feed stream 5: | Solution of | |
| | 4.5 g | of sodium peroxodisulfate |
| | 175.0 g | of deionized water |

Example 10

Stage Polymer SD3

The polymerization was conducted as described in Example 8. However, final pH adjustment was made with 234 g of 25% strength by weight aqueous sodium hydroxide solution.

| Initial charge: | Solution of | |
| --- | --- | --- |
| | 12.0 g | of sodium peroxodisulfate |
| | 468.0 g | of deionized water |
| Feed stream 1: | Solution of | |
| | 266.0 g | of deionized water |
| | 189.0 g | of hydroxypropyl acrylate |
| | 96.0 y | of acrylic acid |
| | 30.0 g | of 50% strength by weight aqueous solution of the sodium salt of 2-acrylamido-2-methylpropanesulfonic acid |
| | 0.6 g | of ethylhexyl thioglycolate |
| Feed stream 2: | 3.0 g | of sodium peroxodisulfate |
| | 117.0 g | of deionized water |
| Feed stream 3: | Monomer emulsion comprising | |
| | 257.0 g | of deionized water |
| | 6.7 g | of emulsifier III |
| | 80.0 g | of 15% strength by weight aqueous methacrylamide solution |
| | 48.0 g | of 50% strength by weight aqueous acrylamide solution |
| | 540.0 g | of styrene |
| | 624.0 g | of n-butyl acrylate |
| Feed stream 4: | Solution of | |
| | 15.0 g | of sodium peroxodisulfate |
| | 198.0 g | of deionized water |

The resulting aqueous polymer dispersion had a solids content of 48.6% by weight, an LT of 33% and a pH of 7.0. The $T_G^{Fox}$ of the first stage was 30° C., that of the second stage 12° C.

Example 11

Stage Polymer SD4

The stage polymer dispersion was prepared similarly to Example 8. However, at the end the aqueous polymer dispersion was neutralized by adding 168 g of 25% strength by weight sodium hydroxide solution.

| Initial charge: | 8.4 g | of sodium peroxodisulfate |
| --- | --- | --- |
| | 600.0 g | of deionized water |
| Feed stream 1: | Solution of | |
| | 389.0 g | of deionized water |
| | 137.6 g | of hydroxyethyl methacrylate |
| | 72.5 g | of acrylic acid |
| | 0.4 g | of ethylhexyl thioglycolate |
| Feed stream 2: | Solution of | |
| | 2.1 g | of sodium peroxodisulfate |
| | 81.0 g | of deionized water |
| Feed stream 3: | Monomer emulsion comprising | |
| | 398.0 g | of deionized water |
| | 4.7 g | of emulsifier III |
| | 56.0 g | of 15% strength by weight methacrylamide solution |
| | 33.6 g | of 50% strength by weight acrylamide solution |
| | 378.0 g | of styrene |
| | 436.8 g | n-butyl acrylate |
| Feed stream 4: | Solution of | |
| | 10.5 g | of sodium peroxodisulfate |
| | 410.0 g | of deionized water |

The resulting aqueous polymer dispersion had a solids content of 34.1% by weight, an LT of 24% and a pH of 9.7. The $T_G^{Fox}$ of the first stage was 100° C., that of the second stage 12° C.

Example 12

Stage Polymer SD5

The stage polymer dispersion was prepared similarly to Example 8. The final adjustment of the pH was made with 168 g of 25% strength by weight sodium hydroxide solution.

| Initial charge: | 8.0 g | of sodium peroxodisulfate |
| --- | --- | --- |
| | 500.0 g | of deionized water |
| Feed stream 1: | Solution of | |
| | 393.0 g | of deionized water |
| | 125.0 g | of hydroxyethyl acrylate |
| | 75.0 g | of acrylic acid |
| | 0.4 g | of ethylhexyl thioglycolate |
| Feed stream 2: | Solution of | |
| | 2.0 g | of sodium peroxodisulfate |
| | 81.0 g | of deionized water |
| Feed stream 3: | Monomer emulsion comprising | |
| | 396.0 g | of deionized water |
| | 4.4 g | of emulsifier III |
| | 53.3 g | of 15% strength by weight methacrylamide solution |
| | 32.0 g | of 50% strength by weight acrylamide solution |
| | 360.0 g | of styrene |
| | 416.0 g | n-butyl acrylate |
| Feed stream 4: | Solution of | |
| | 10.0 g | of sodium peroxodisulfate |
| | 416.0 g | of deionized water |

The resulting aqueous polymer dispersion had a solids content of 34.7% by weight, a light transmittance of 54% and a pH of 6.8. The $T_G^{Fox}$ of the first stage was 9° C., that of the second stage 12° C.

Example 13

Stage Polymer SD6

The stage polymer dispersion was prepared similarly to Example 9. However, at the end the batch was neutralized with 67.5 g of a 20% strength by weight aqueous suspension of calcium hydroxide.

| Initial charge: | 3.6 g | of sodium peroxodisulfate |
| --- | --- | --- |
| | 120.0 g | of deionized water |
| Feed stream 1: | Solution of | |
| | 91.0 g | of deionized water |
| | 25.2 g | of 25% strength by weight aqueous sodium hydroxide solution |
| | 58.5 g | of hydroxypropyl acrylate |
| | 31.5 g | of acrylic acid |
| | 0.2 g | ethylhexyl thioglycolate |
| Feed stream 2: | Solution of | |
| | 0.9 g | of sodium peroxodisulfate |
| | 35.0 g | of deionized water |
| Feed stream 3: | 162.0 g | of sytrene |
| | 187.2 g | of n-butyl acrylate |
| Feed stream 4: | Solution of | |
| | 64.0 g | of deionized water |
| | 24.0 g | of 15% strength by weight aqueous methacrylamide solution |
| | 14.4 g | of 50% strength by weight aqueous acrylamide solution |
| Feed stream 5: | Solution of | |
| | 4.5 g | of sodium peroxodisulfate |
| | 175.0 g | of deionized water |

The resulting aqueous polymer dispersion had a solids content of 44.3% by weight, an LT of 50% and a pH of 10.7. The $T_G^{Fox}$ of the first stage was 17° C., that of the second stage 12° C.

Example 14

Stage Polymer SD7

The stage polymer dispersion was prepared similarly to Example 9. The final adjustment of the pH was made by adding 50.0 g of a 20% strength by weight sodium hydroxide solution.

| Initial charge: | Solution of | |
| --- | --- | --- |
| | 2.4 g | of sodium peroxodisulfate |
| | 150.0 g | of deionized water |
| Feed stream 1: | Solution of | |
| | 154.0 g | of deionized water |
| | 24.0 g | of hydroxypropyl acrylate |
| | 27.0 g | of methacrylic acid |
| | 6.0 g | of acrylic acid |
| | 6.0 g | of 50% strength by weight aqueous solution of the sodium salt of 2-acrylamido-2-methylpropanesulfonic acid |
| | 0.1 g | of ethylhexyl thioglycolate |
| Feed stream 2: | Solution of | |
| | 0.9 g | of sodium peroxodisulfate |
| | 35.0 g | of deionized water |
| Feed stream 3: | 108.0 g | of styrene |
| | 124.8 g | of n-butyl acrylate |
| Feed stream 4: | Solution of | |
| | 74.0 g | of deionized water |
| | 16.0 g | of 15% strength by weight aqueous methacrylamide solution |
| | 9.6 g | of 50% strength by weight aqueous acrylamide solution |
| Feed stream 5: | Solution of | |
| | 3.0 g | of sodium peroxodisulfate |
| | 117.0 g | of deionized water |

The resulting aqueous polymer dispersion had a solids content of 34.0% by weight, an LT of 33% and a pH of 6.7. The $T_G^{Fox}$ of the first stage was 75° C., that of the second stage 12° C.

V. Preparing the Polymer Powders

V.1 Preparing a spray assistant based on naphthalenesulfonic acid-formaldehyde condensation products (spray assistant S1)

To an initial charge of 1.20 kg of naphthalene there were added, at 85° C. and with cooling, 1.18 kg of concentrated sulfuric acid at a rate such that the internal temperature remained constantly below 150° C. After the end of the addition the mixture was left to react at an internal temperature of from 140 to 150° C. for 5 h. The reaction mixture was cooled to 50° C., and 0.80 kg of 30% strength by weight aqueous formaldehyde solution was added in portions while maintaining an internal temperature of from 50 to 55° C. Immediately after the end of this addition 0.70 kg of deionized water were added, and the mixture was heated to 100° C. and left to react further at this temperature for 5 h. It was then cooled to 65° C., and 0.80 kg of a 35% strength by weight suspension of calcium hydroxide in deionized water was added. The mixture was filtered through a 200 μm sieve to give 2.1 kg of an aqueous solution S1 having a solids content of 35% by weight and a pH of 8.0.

V.2 Preparing the Polymer Powders by Spray Drying

To prepare the polymer powders the aqueous copolymer solutions C1 to C7 and the alcoholic solution of the copolymer CV1 were diluted with water to a solids content of 30% by weight, the polymer dispersions D1 to D4 to a solids content of 50% by weight, and the dispersions of the stage polymers SD1 to SD7 to a solids content of 40% by weight, where the solids content was above these levels. Stage polymers with lower solids contents were used undiluted. The spray assistant S1 was diluted to a solids content of 20% by weight.

The aqueous solutions of the copolymers from Examples 1 to 7 were added, where appropriate together with the solution of the spray assistant S1, to the aqueous polymer dispersions D1 to D4. The resulting mixtures were then diluted with deionized water to a solids content of 35% by weight. A corresponding procedure was followed with the dispersions of the stage polymers SD1 to SD7. For comparison, a formulation was prepared from copolymer CV1 and dispersion D2, having a solids content of 35% by weight.

Spray drying was carried out in a Minor laboratory dryer from GEA Wiegand GmbH (Niro Division) with dual-substance nozzle atomization and a tower entry temperature of 130° C. and an exit temperature of 60° C. (throughput: about 2 kg of spray feed/h). As antiblocking agent, about 2.0% by weight (based on solid polymer mixture) of finely divided silicic acid was metered into the drying chamber together with the spray feed. Proportions, drying conditions and the results are summarized in Table 2.

TABLE 2

Results of the spray drying

| Powder | Dispersion[1] | Copolymer[1] | Spray assistant[1] | Wall deposit | Powder yield |
| --- | --- | --- | --- | --- | --- |
| P1 | 80 p D1 | 20 p C1 | none | slight | 85% |
| P2 | 80 p D2 | 20 p C1 | none | slight | 77% |
| P3 | 80 p D1 | 20 p C2 | none | slight | 92% |
| P4 | 80 p D2 | 20 p C2 | none | slight | 68% |
| P5 | 72.7 p D1 | 20 p C3 | 7.3 p S1 | slight | 71% |
| P6 | 80 p D1 | 20 p C4 | none | slight | 70% |
| P7 | 80 p D2 | 20 p C4 | none | slight | 64% |
| P8 | 80 p D2 | 20 p C5 | none | slight | 67% |
| P9 | 80 p D3 | 20 p C1 | none | slight | 71% |

TABLE 2-continued

Results of the spray drying

| Powder | Dispersion[1] | Copolymer[1] | Spray assistant[1] | Wall deposit | Powder yield |
|---|---|---|---|---|---|
| P10 | 80 p D4 | 20 p C1 | none | slight | 78% |
| P11 | 100 p SD1 | | none | slight | 70% |
| P12 | 95.2 p SD1 | | 4.8 p S1 | slight | 69% |
| P13 | 90.9 p SD1 | | 9.1 p S1 | slight | 70% |
| P14 | 100 p SD2 | | none | slight | 86% |
| P15 | 95.2 p SD3 | | 4.8 p S1 | slight | 72% |
| P16 | 90.9 p SD3 | | 9.1 p S1 | slight | 73% |
| P17 | 100 p SD4 | | none | slight | 70% |
| P18 | 95.2 p SD4 | | 4.8 p S1 | slight | 67% |
| P19 | 95.2 p SD5 | | 4.8 p S1 | slight | 77% |
| P20 | 90.9 p SD5 | | 9.1 p S1 | slight | 76% |
| P21 | 92.6 p SD6 | | 7.4 p S1 | slight | 72% |
| P22 | 100 p SD1 | | none | slight | 71% |
| VP1[2] | 80 p D2 | 20 p CV1 | none | severe, cottony | 59% |

[1] Parts (p) calculated as proportion of solids of the dispersion or of the copolymer solution
[2] Comparison powder

VI. Mineral Building Material Preparations

To test the performance properties of the polymer powders obtained as in section V, the following recipe was used to formulate a base mixture for a self-leveling filling composition:

| | |
|---|---|
| Cement Marker PZ 35 F | 33.60 pbw[1] |
| Fused high-alumina cement | 10.00 pbw |
| Quartz sand F34 | 33.60 pbw |
| Carborex ® 5[2] | 20.00 pbw |
| Antifoam[3] | 1.00 pbw |
| Hydrated lime | 1.17 pbw |
| Sodium carbonate | 0.30 pbw |
| Tartaric acid | 0.20 pbw |
| Lithium carbonate | 0.03 pbw |
| Carboxymethylcellulose[4] | 0.10 pbw |

[1] parts by weight
[2] calcium carbonate of diameter d = 5 μm (from Omya)
[3] pulverulent antifoam: 5–10% by weight of a mixture of an ethoxylated fatty alcohol and the fatty acid ester of a polyether alcohol to 90 to 95% by weight of calcium carbonate powder; d = 40 μm
[4] Tylose H 300 P from Hoechst A test mixture is prepared, in the manner described in the respective test procedure, from 100 parts by weight of the base mixture, 3 parts by weight of the respective polymer powder P1 to P 22 and 24 parts by weight of water. The results are summarized in Table 3.

TABLE 3

Results of performance testing

| Addition | Self-leveling (cm)[a] | Open time (min)[b] | Shore hardness C after 4 h[c] | Shore hardness C after 6 h[c] | Adhesion to primed Eterplan[d] |
|---|---|---|---|---|---|
| none | the composition does not spread, so no further testing possible | | | | |
| 3.0 pbw P1 | 17.1 | 40 | 58 | 70 | 3 |
| 3.0 pbw P2 | 16.8 | 45 | 67 | 85 | 1–2 |
| 3.0 pbw P3 | 16.2 | 40 | 48 | 72 | 3 |
| 3.0 pbw P4 | 16.6 | 45 | 68 | 85 | 1–2 |
| 3.0 pbw P5 | 16.2 | 30 | 56 | 79 | 2 |
| 3.0 pbw P6 | 16.8 | 40 | 50 | 63 | 3 |
| 3.0 pbw P7 | 17.0 | 45 | 66 | 82 | 1–2 |
| 3.0 pbw P8 | 17.3 | 40 | 55 | 73 | 3 |
| 3.0 pbw P9 | 16.4 | 35 | 53 | 75 | 3 |
| 3.0 pbw P10 | 16.8 | 35 | 58 | 76 | 3 |
| 3.0 pbw P11 | 16.1 | 30 | 47 | 76 | 2–3 |
| 3.0 pbw P12 | 16.7 | 30 | 42 | 72 | 2–3 |
| 3.0 pbw P13 | 16.2 | 25 | 53 | 78 | 3 |
| 3.0 pbw P14 | 16.7 | 30 | 49 | 70 | 2–3 |
| 3.0 pbw P15 | 16.6 | 25 | 54 | 72 | 2 |
| 3.0 pbw P16 | 16.3 | 25 | 52 | 74 | 2–3 |
| 3.0 pbw P17 | 16.9 | 25 | 56 | 82 | 2 |
| 3.0 pbw P18 | 16.3 | 25 | 53 | 78 | 2–3 |
| 3.0 pbw P19 | 16.3 | 30 | 46 | 72 | 2 |
| 3.0 pbw P20 | 16.9 | 30 | 64 | 76 | 2 |
| 3.0 pbw P21 | 16.4 | 25 | 71 | 82 | 1–2 |
| 3.0 pbw P22 | 16.9 | 25 | 69 | 86 | 2 |

[a] Leveling performance
[b] Time-dependent balancing behavior
[c] Shore hardness C
[d] subjective relative values re a)

An electric manual stirrer with a kneading hook (Topmix from Krupps) was used to prepare a ready-to-use formulation from 100 g of base mixture, 3 g of dispersion powder and 24 g of water.

An Eterplan panel (fiber cement panel from Eternit) was cleaned with a cloth and coated 24 hours before the beginning of the experiment with an aqueous dispersion of 54% by weight styrene and 46% by weight 2-ethylhexyl acrylate (10% strength by weight) (amount applied about 100 g/m$^2$).

The ready-to-use formulation was poured from a height of about 10 cm onto the pretreated Eterplan plate which had been provided with a coordinate cross. After about 2 hours the spreading of the filling compositions in all directions was read off on the coordinate cross, and the 4 values obtained were added and divided by 2. This gives the self-leveling in centimeters.

re b)

A ready-to-use formulation is prepared as described under a).

The finished mixture was poured (t=0) from a height of about 10 cm onto the center of the pretreated Eterplan panel (see a). Then every 5 minutes a metal rod was moved rapidly and completely through the applied filling composition, beginning at the outer edge and proceeding on and through the center point. This procedure was repeated at least 8 times.

After the composition has dried, a circle with a diameter of about 80 mm is drawn around the center point of the composition. On this circle, an investigation is made to discover the points at which the filling composition has coalesced again after having been penetrated with the metal rod. In this context, the open time corresponds to that point in time at which the filling composition still just coalesced.

re c)

As described under a), a ready-to-use formulation is prepared and is poured onto a pretreated Eterplan panel (see above). After about 4 hours, at a distance of 4 cm from the center point of the mass and at three different points, the Shore C hardness is measured with an appropriate tester (the hardness is a dimensionless value of from 1 to 100 for the force required to press the frustoconical testing die into the composition). This measurement is repeated after a further 2 hours have elapsed. The value indicated in the Table is in each case the mean of the individual measurements.

re d)

A ready-to-use formulation is prepared as described under a) and is poured onto a pretreated Eterplan panel (see b). After 7 days at room temperature the applied filling composition is tested using hammer and chisel. The assessment is made by ratings 1 to 6, where 1 denotes good adhesion and 6 denotes poor adhesion.

We claim:

1. A polymer powder produced by drying aqueous polymer dispersions in the presence of a driving assistant, wherein the polymer in the polymer dispersion to be dried has a glass transition temperature $T_G$ of below 65° C. and wherein the drying assistant comprises at least one copolymer or salt thereof which in copolymerized form comprises based in each case on the overall number of copolymerized monomers.

| | |
|---|---|
| from 20 to 95 mol % | of at least one ethylenically unsaturated carboxylic acid having 3 to 6 C atoms (monomers A) |
| from 5 to 80 mol % | of at least one hydroxyalkyl ester of an ethylenically unsaturated carboxylic acid having 3 to 6 C atoms (monomers B) and |
| up to 10 mol % | of further monomers C. |

2. The polymer powder of claim 1 wherein the polymer in said aqueous polymer dispersion comprises from 80 to 100% by weight of at least one monomer, a, selected from $C_2$–$C_6$ olefins, vinylaromatic compounds; esters of ethylenically unsaturated $C_3$–$C_6$ monocarboxylic acids or $C_4$–$C_8$ dicarboxylic acids and $C_1$–$C_{12}$-alkanols or $C_5$–$C_{10}$-cycloalkanols; vinyl esters or (meth)allyl esters of aliphatic $C_1$–$C_{20}$ carboxylic acids; conjugated dienes; and from 0 to 20% by weight of at least one other monomer, b, which has at least one ethylenically unsaturated group.

3. A polymeric binder comprising the polymer powder of claim 1.

4. A method, comprising:

mixing from 0.1 to 20% by weight of the polymer powder of claim 1;
from 20 to 60% by weight of at least one mineral binder;
up to 25% by weight of an auxiliary; and
a remaining amount of an additive selected from the group consisting of sand, a filler, a pigment, a natural fiber, a synthetic fiber and a mixture thereof, to obtain a dry mineral building material.

5. A method, comprising:

free radical polymerizing a) from 80 to 100% by weight of at least one monomer selected from the group consisting of $C_2$–$C_6$ olefins, vinylaromatic compounds, esters of ethylenically unsaturated $C_3$–$C_6$ monocarboxylic acids or $C_4$–$C_8$ dicarboxylic acids with $C_1$–$C_{12}$ alkanols or $C_5$–$C_{10}$ cycloalkanols, vinyl esters of aliphatic $C_1$–$C_{20}$ carboxylic acids, (meth)allyl esters of aliphatic $C_1$–$C_{20}$ carboxylic acids and conjugated dienes, and b) from 0 to 20% by weight of at least one other monomer which has at least one ethylenically unsaturated group in an aqueous emulsion in the presence of the polymer powder according to claim 1.

6. A method, comprising:

(I) free radical polymerizing

A) from 20 to 95 mol % of at least one ethylenically unsaturated carboxylic acid having 3 to 6 C atoms;

B) from 5 to 80 mol % of at least one hydroxyalkylester of an ethylenically unsaturated carboxylic acid having 3 to 6 C atoms; and C) up to 10 mol % of further monomers in an aqueous medium, thereby obtaining an aqueous solution of the polymer powder according to claim 1, and (II) free radical polymerizing a) from 80 to 100% by weight of at least one monomer selected from the group consisting of $C_2$–$C_6$ olefins, vinylaromatic compounds, esters of ethylenically unsaturated $C_3$–$C_6$ monocarboxylic acids or $C_4$–$C_8$ dicarboxylic acids with $C_1$–$C_{12}$ alkanols or $C_5$–$C_{10}$ cycloalkanols, vinyl esters of aliphatic $C_1$–$C_{20}$ carboxylic acids, (meth)allyl esters of aliphatic $C_1$–$C_{20}$ carboxylic acids and conjugated dienes, and b) from 0 to 20% by weight of at least one other monomer which has at least one ethylenically unsaturated group in the presence of the aqueous solution of the polymer powder according to claim 1, obtained in (I).

7. A modified building material comprising the polymer powder of claim 1.

8. The method according to claim 3, further comprising: adding water, thereby obtaining a mineral building material containing water.

* * * * *